(12) United States Patent
Dykstra et al.

(10) Patent No.: US 9,390,168 B1
(45) Date of Patent: Jul. 12, 2016

(54) CUSTOMER KEYWORD-BASED ITEM RECOMMENDATIONS

(75) Inventors: Aaron James Dykstra, Federal Way, WA (US); Tri M. Cao, Seattle, WA (US); Stephen Michael Brozovich, Auburn, WA (US); Adam Lloyd Days, Lynwood, WA (US); Jinesh U. Vora, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 1031 days.

(21) Appl. No.: 12/891,931

(22) Filed: Sep. 28, 2010

(51) Int. Cl.
*G06F 7/00* (2006.01)
*G06F 17/00* (2006.01)
*G06F 17/30* (2006.01)

(52) U.S. Cl.
CPC ................... *G06F 17/30752* (2013.01)

(58) Field of Classification Search
CPC ............ G06F 17/30752; G06F 17/30772
See application file for complete search history.

(56) References Cited

U.S. PATENT DOCUMENTS

| 6,801,909 B2 * | 10/2004 | Delgado et al. |
| 7,774,335 B1 * | 8/2010 | Scofield et al. ............... 707/709 |
| 2006/0195442 A1 * | 8/2006 | Cone et al. ........................ 707/5 |

\* cited by examiner

*Primary Examiner* — Susan Chen
(74) *Attorney, Agent, or Firm* — Thomas | Horstemeyer, LLP (57) ABSTRACT

Disclosed are various embodiments for generating recommendations based at least in part on keywords associated with users. In some embodiments, among others, a system includes at least one computing device and a recommendation generator executable in the at least one computing device. The recommendation generator comprises logic that generates a plurality of pools of keywords based at least in part on a plurality of behavioral histories. Each pool corresponds to a behavioral history of a user across a plurality of domains. The recommendation generator also comprises logic that clusters at least a number of the keywords in a cluster across at least two pools including the same keyword and logic that recommends an item based at least in part on the cluster of keywords.

23 Claims, 8 Drawing Sheets

CUSTOMER KEYWORD-BASED ITEM RECOMMENDATIONS

BACKGROUND

When a website is new, little information exists regarding the preferences of users because of a dearth of view histories, purchase histories, and other data related to users who have visited the website. So, the website is unable to provide suggestions to visitors regarding content or products that the visitor might enjoy.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present application describes various embodiments of systems and methods for generating customer keyword-based item recommendations. For example, in some embodiments, a computing device gathers data regarding a user across multiple domains. Keywords are extracted from this data, and the keywords are associated with the user, forming keyword-user associations. These keyword-user associations are then ranked and used to generate recommendations regarding items for the user. In the following discussion, a general description of the system and its components is provided, followed by a discussion of the operation of the same.

Figure 1:
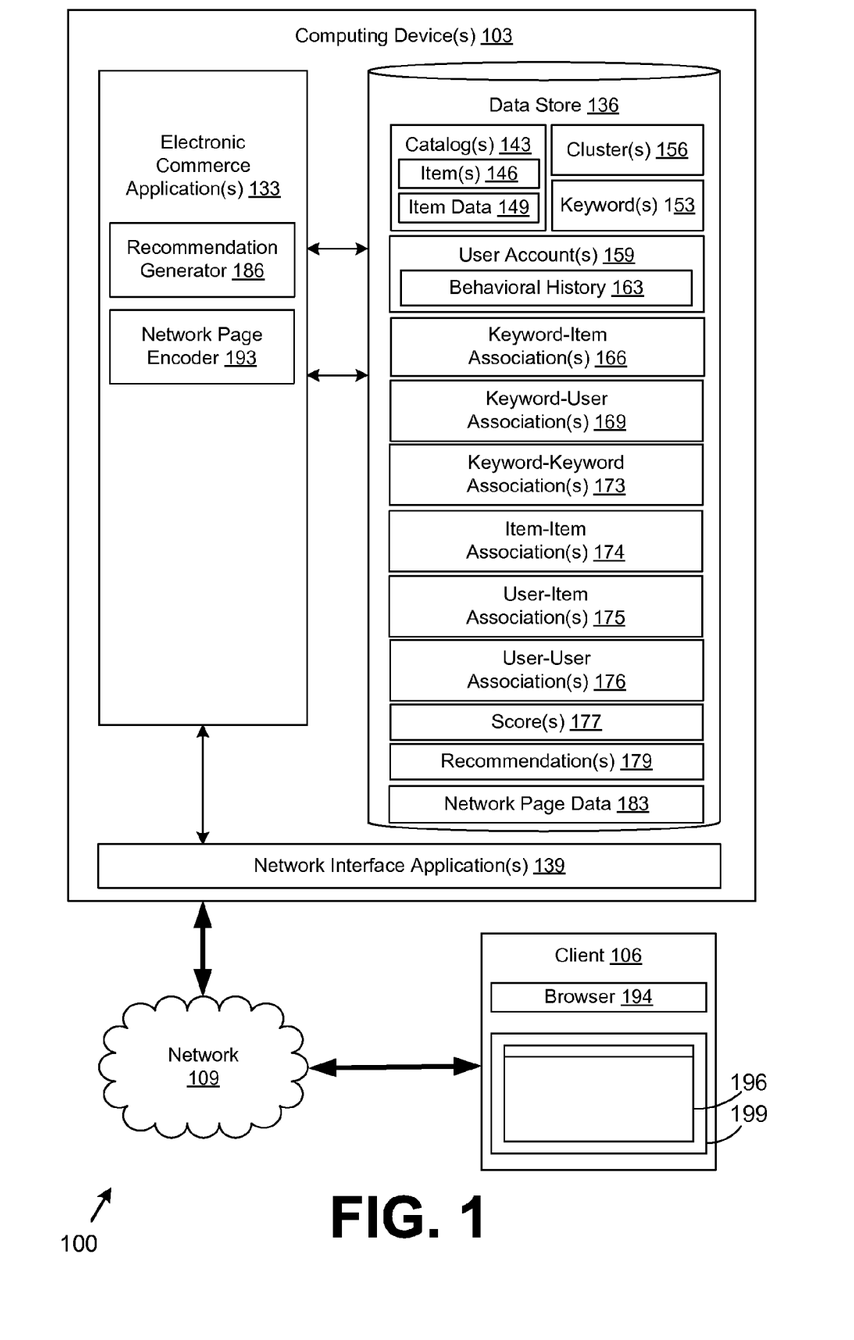
FIG. 1 is a drawing of networked environment according to various embodiments of the present disclosure.

With reference to FIG. 1, shown is a networked environment 100 according to various embodiments. The networked environment 100 includes a computing device 103, a client 106, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. A plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device is referred to in the singular, it is understood that a plurality of computing devices 103 may be employed in various arrangements, as described above.

Various applications and/or other functionality may be executed in the computing device 103 according to various embodiments. Also, various data is stored in a data store 136 that is accessible to the computing device 103. The data store 136 may be representative of a plurality of data stores as can be appreciated. The data stored in the data store 136, for example, is associated with the operation of the various applications and/or functional entities described below.

The components executed on the computing device 103, for example, include an electronic commerce application(s) 133, a network interface application(s) 139, and other applications, services, processes, systems, engines, or functionality not discussed in detail herein. The electronic commerce application 133 is executed in order to facilitate the online purchase of items 146 over the network 109. The electronic commerce application 133 also performs various backend functions associated with the online presence of a merchant in order to facilitate the online purchase of items 146, as will be described. For example, the electronic commerce application 133 generates one or more network pages 196, using a network page encoder 193, such as web pages or other types of network content that are provided to client(s) 106 for the purposes of selecting items 146 for purchase, rental, download, lease, or other form of consumption, as will be described. The electronic commerce application 133 further includes a recommendation generator 186 and/or other applications useful to facilitate electronic commerce.

The data stored in the data store 136 includes, for example, catalogs 143, items 146, item data 149, keywords 153, clusters 156, user accounts 159, behavioral history 163, keyword-item associations 166, keyword-user associations 169, keyword-keyword associations 173, item-item associations 174, user-item associations 175, user-user associations 176, scores 177, recommendations 179, network page data 183, and/or other data related to electronic commerce. A catalog 143 is a collection of items 146 offered for sale by an online merchant. As used herein, the term "item" 146 may refer to a product, good, service, bundle of products, goods and/or services, software download, multimedia download, social networking profile, or other item 146 that may be offered for sale, purchase, rental, lease, download, and/or any other form of consumption, as can be appreciated. The various data stored as item data 149 may include titles, descriptions, quantities, images, representations, options, weights, customer reviews, customer ratings, keywords, tags, shipping restrictions, prices, tax classifications, categories, unique identifiers, and any other data related to items 146.

A keyword 153 is a word, phrase or string that is related to an item 146 or other multimedia content. A keyword 153 may be descriptive of the item 146 or content, and one or more instances of the keyword 153 may occur in the content or in the item data 149 related to an item 146. A keyword-keyword association 173 is an association of a keyword 153 with another keyword 153. For example, a keyword 153 and another keyword 153 may frequently appear together in content, and the keyword 153 and the other keyword 153 may be associated in a keyword-keyword association 173.

In some embodiments, keywords 153 may be generated based on one or more catalogs 143 by indexing the item data 149 associated with each item 146 included in the catalog 143. A keyword 153 extracted from item data 149 associated with an item 146 is also associated with the respective item 146 to form a keyword-item association 166. Also, in some embodiments, a catalog 143 may be associated with a domain. A subset of the keyword-item associations 166 includes keyword-item associations 166 that associate a keyword 153 with a best selling item 146.

An item-item association 174 associates an item 146 with another item 146. A subset of the item-item associations 174 include complementary item-item associations 174 that associate complementary items 146 with each other. For example, a complementary item-item association 174 associates a first item 143 with a second item 143 that is a complement of the first item 143. Another subset of the item-item associations 174 include substitutable item-item associations 174 that associate items 146 that are substitutable with each other. For example, a substitutable item-item association 174 associates a first item 143 with a second item 143 that is a substitute of the first item 143. Whether an item 146 is a complement or substitute for another item 146 may be determined using a behavioral history 163 corresponding to a user. For example, items 146 that are substitutes may be viewed in a view session in a view history, and items 146 that are complements may be purchased together in a purchase history.

A user account 159 is associated with a user and may include a shipping address, an electronic mail (e-mail) address, profile data, payment information, and other data related to a user. Further, the user account 159 includes a behavioral history 163 associated with the user. The behavioral history 163 may include content such as, for example, a view history, a purchase history, a return history, a wish list, a registry, click data, a search query, a category selected by a user to filter search results, a preference, a rating, a review, a comment, and other data associated with the user. In some embodiments, the behavioral history 163 of a user may be gathered from multiple domains, each domain having a view history, a purchase history, a return history, a wish list, a registry, click data, and other data associated with the user and the domain.

A plurality of keywords 153 corresponding to a behavioral history 163 of a user may be generated by indexing the text of a view history, a purchase history, a return history, a wish list, a registry, click data, search queries, and other data associated with the user account. Additionally, keywords 153 may be gathered from a shipping address, a geolocation of a user provided by a client 106 (FIG. 1), an internet protocol (IP) address associated with a client 106, a tag inputted by a user, and/or a preference inputted by a user. Further, keywords 153 may be gathered from other network pages 196 corresponding to other users associated with the user in another forum such as a social networking site. In this manner, keywords 153 may be gathered regarding a user across multiple domains and not just the domain of the online merchant. The keywords 153 gathered from a behavioral history 163 corresponding to a user are associated with the user, forming a keyword-user association 169.

Also, a user may be associated with an item 146 to form a user-item association 175. The item 146 may be included in the behavioral history 163 corresponding to the user. Further, a user may be associated with another user to form a user-user association 176. For example, if a keyword 153 appears in the behavioral histories 163 of two users, those users may be associated with each other in a user-user association 176. Similarly, if an item 146 appears in the behavioral histories 163 of two users, those users may be associated with each other in a user-user association 176. Also, a user-user association 176 may be formed based at least in part on a connection between users on a social networking site.

Each association may also be associated with one or more scores 177. A score 177 may indicate the strength of an association relative to other associations. Also, the score 177 may be associated with a direction and depend on the direction. So, for one direction, the score 177 associated with the association may have a value, and for another direction, another score 177 associated with the association may have another value.

For a keyword-user association 169, the score 177 is based at least in part on a behavioral history 163 corresponding to a user. For example, the score 177 may be based at least in part on one of the following factors corresponding to the keyword 153 associated with the user: a number of occurrences of the keyword 153 in the behavioral history 163, a phrase length, a part of speech (e.g., a noun, a verb), a purchase, a view, a return, a selection, and data included in the behavioral history 163.

Also, in some embodiments, the score 177 is based at least in part on at least one of a time decay and an inverse general population keyword popularity. In some embodiments, the score 177 may be based at least in part on a term frequency (TF), an in document frequency (IDF), a latent semantic analysis (LSA), and/or a latent semantic index (LSI) associated with the keyword 153 and the behavioral history 163 of the user.

The data store 136 may store these scores 177 as well as recommendations 179. Recommendations 179 will be discussed in further detail below. The network page data 183 includes data used in generating network pages 196. Such data may include templates, graphics, text, client-side code, style sheets, and so on.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, an electronic book reader, a cellular telephone, a smart phone, set-top box, music players, web pads, tablet computer systems, game consoles, or other devices with like capability.

The client 106 may be configured to execute various applications such as a browser 194 and/or other applications. The browser 194 may be executed in a client 106, for example, to access and render network pages 196, such as web pages, or other network content served up by the computing device 103 and/or other servers. The client 106 may be configured to execute applications beyond a browser 194 such as, for example, email applications, instant message applications, short message service applications, and/or other applications.

When executed in a client 106, the browser 194 renders network pages 196 on a respective display device 199 and may perform other functions. The browser 194 accesses network pages 196, such as web pages or other types of content from the computing device 103 in order to access the functionality of the recommendation generator 186, and other components implemented in the computing device 103, as will be described.

A network page 196 may include code that generates dynamic network pages when executed or interpreted in the client 106. Such code may be written in any suitable programming language, such as PHP, Perl, Objective C, Java, Ruby, etc. Also, the network pages 196 may also include code configured to be executed or interpreted within the client 106 in order to render a dynamic network page 196. Such code may be referred to as an executable and may be written in any suitable programming language, such as Java Script, Java, etc.

A network page 196 may also include network page data 183 that is data relating to network pages 196 served up by the electronic commerce application 133. To this end, network page data 183 may include static network pages 196 or static elements of network pages 196, for example, in hypertext markup language (HTML), extensible markup language (XML), and/or any other language suitable for creating network pages 196.

The recommendation generator 186 is executed by the computing device 103 to generate recommendations to a user based at least in part on a behavioral history 163 related to a user. The recommendation generator 186 extracts keywords 153 from a behavioral history 163 corresponding to a user, and these keywords 153 are associated with the user to form keyword-user associations 169, which are ranked according to an assigned score 177. These keyword-user associations 169 are used by the recommendation generator 186 to generate recommendations 179 regarding items 146 to the user. In some embodiments, the ranked keywords 153 associated in the keyword-user associations 169 for a plurality of users are clustered. These clusters 156 may then be used by the recommendation generator 186 to generate a recommendation 179 to at least one of the users in the plurality. The generated recommendations 179 are encoded in a network page 196 that is sent to a user via a client 106.

Figure 2:
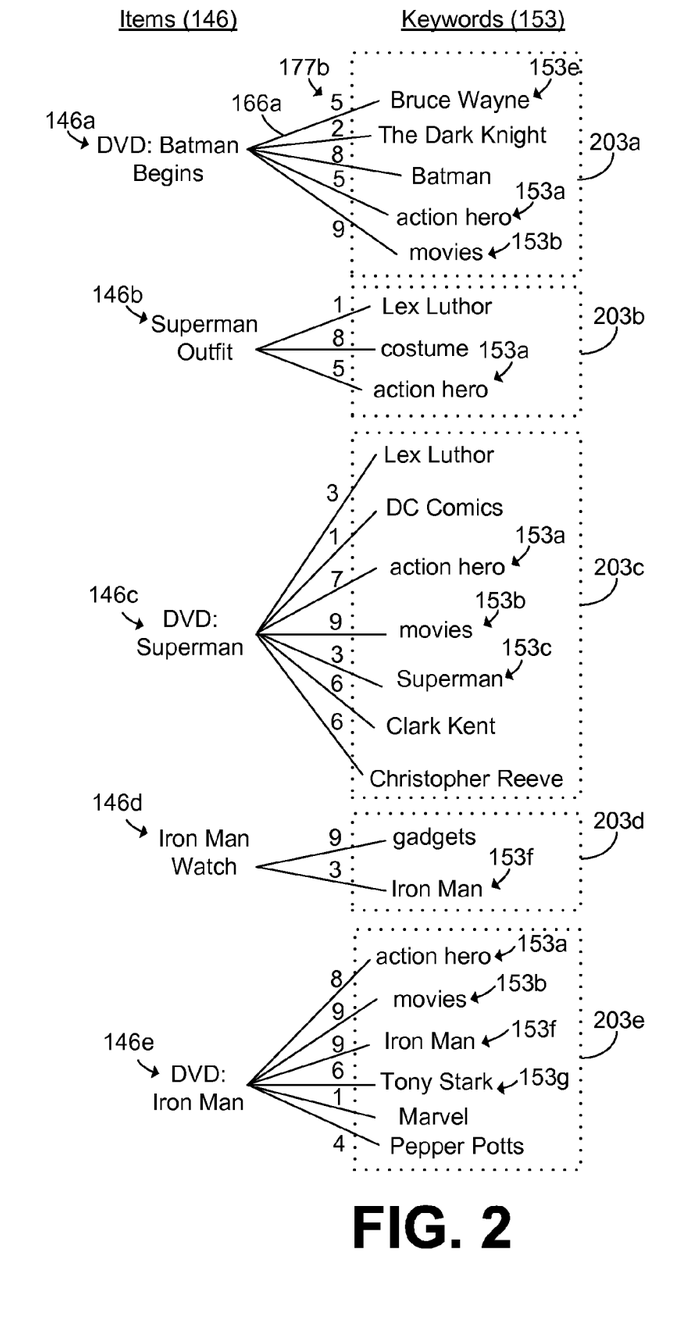
FIG. 2 is a diagram of examples of the various items, keywords, and keyword-item associations in FIG. 1 according to an embodiment of the present disclosure.

FIG. 2 illustrates examples of various items 146 (FIG. 1), keywords 153 (FIG. 1), and keyword-item associations 166 (FIG. 1) according to an embodiment of the present disclosure. Further, FIG. 2 includes a plurality of pools 203 of keywords 153, denoted herein as 203a, 203b, 203c, 203d, and 203e. Each pool 203 is generated based at least in part on extracting keywords 153 from item data 149 (FIG. 1) and other content related to an item 146. For example, the keywords 153 included in pool 203a (e.g., "Bruce Wayne," "The Dark Knight," "Batman," "action hero," and "movies") extracted from item data 149 and other content related to the item 146a (e.g., DVD: Batman Begins).

As can be seen in the example in FIG. 2, a pool 203 may include a keyword 153 that is also included in another pool 203. Each keyword 153 in a pool 203 is associated with the item 146 that corresponds to the item data 149 and/or other related content used to generate the keyword 153 to form keyword-item associations 166. For example, the keyword 153e (e.g., "Bruce Wayne") is associated with the item 146a (e.g., DVD: Batman Begins) to form the keyword-item association 166, denoted herein as 166a. Also, as illustrated in FIG. 2, a score 177 may be associated with each keyword-item association 166. For example, a score 177, denoted herein as 177b (e.g., 5), is associated with the keyword-item association 166a.

Figure 3:
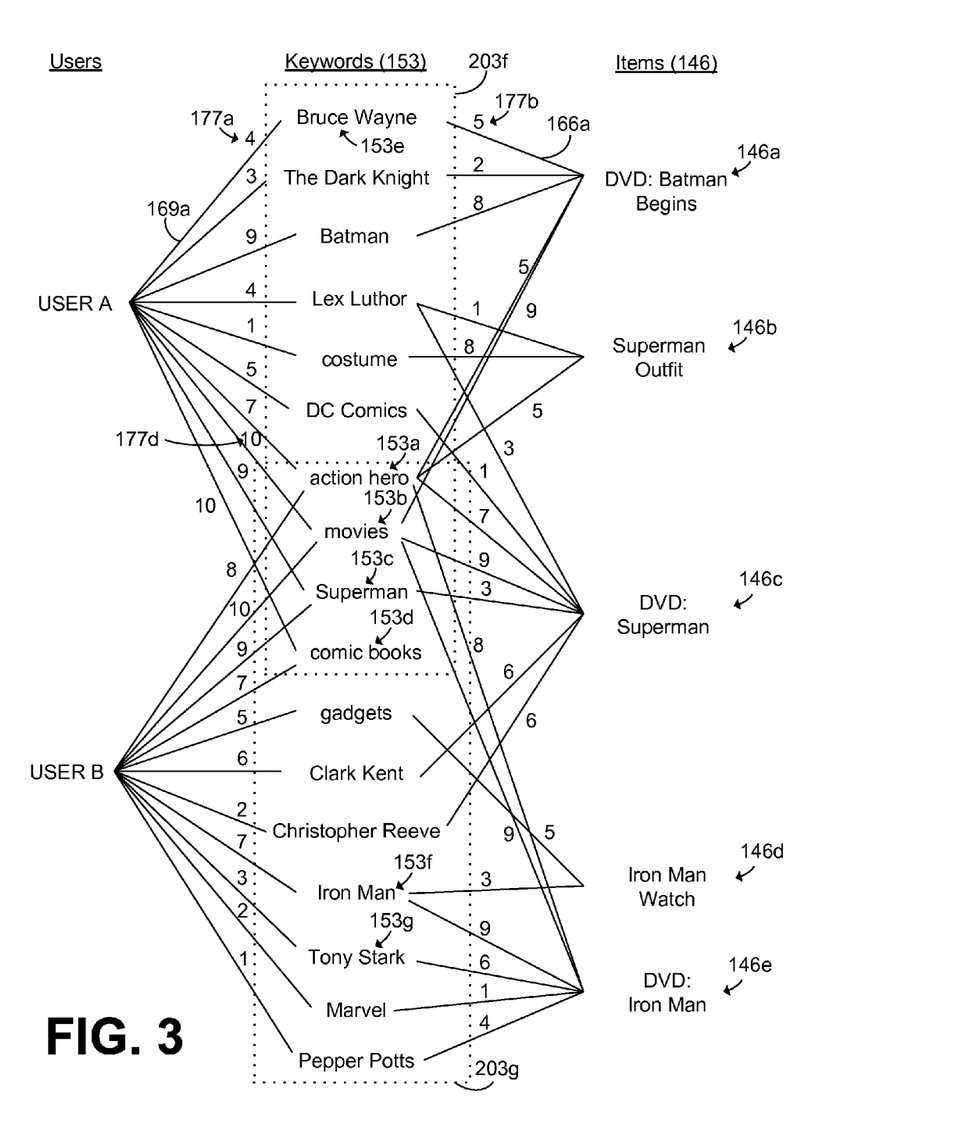
FIG. 3 is a diagram of an example of a plurality of relationships between a plurality of users and the keywords and items of FIG. 1 according to an embodiment of the present disclosure.

FIG. 3 illustrates the examples of keyword-item associations 166 (FIG. 1) shown in FIG. 2 as well as various keyword-user associations 169 (FIG. 1) according to an embodiment of the present disclosure. As mentioned above, a keyword-user association 169 is an association of a keyword 153 (FIG. 1) with a user. For example, FIG. 3 illustrates a keyword-user association 169, denoted herein as keyword-user association 169a, which associates user A with the keyword 153e (e.g., "Bruce Wayne"). A score 177 (FIG. 1), denoted herein as 177a (e.g., 4), is associated with the keyword-user association 169a.

FIG. 3 further includes two pools 203, denoted herein as 203f, 203g, that each include a plurality of keywords 153. In the example illustrated in FIG. 3, some keywords 153 are common to both pools 203f, 203g. Also, user A is associated with each of the keywords 153 included in the pool 203f, and user B is associated with each of the keywords 153 included in the pool 203g. In some cases, a keyword 153 may be associated with more than one user. For example, in FIG. 3, keywords 153a, 153b, 153c, and 153d (e.g., "action hero," "movies," "Superman," and "comic books") are associated with both user A and user B.

Also, as discussed above, a keyword-item association 166 is an association of a keyword 153 with an item 146 (FIG. 1). FIG. 3 illustrates an example of a keyword-item association 166, denoted herein as keyword-item association 166a, which associates the keyword 153e (e.g., "Bruce Wayne") with item 146a (e.g., DVD: Batman Begins). A score 177b (e.g., 5) is associated with the keyword-item association 166a. In some cases, a keyword 153 may be associated with more than one item 146. For example, in FIG. 3, the keyword 153a (e.g., "action hero") is associated with items 146a, 146b, 146c, and 146e (e.g., DVD: Batman Begins, Superman Outfit, DVD: Superman, and DVD: Iron Man).

Figure 4:
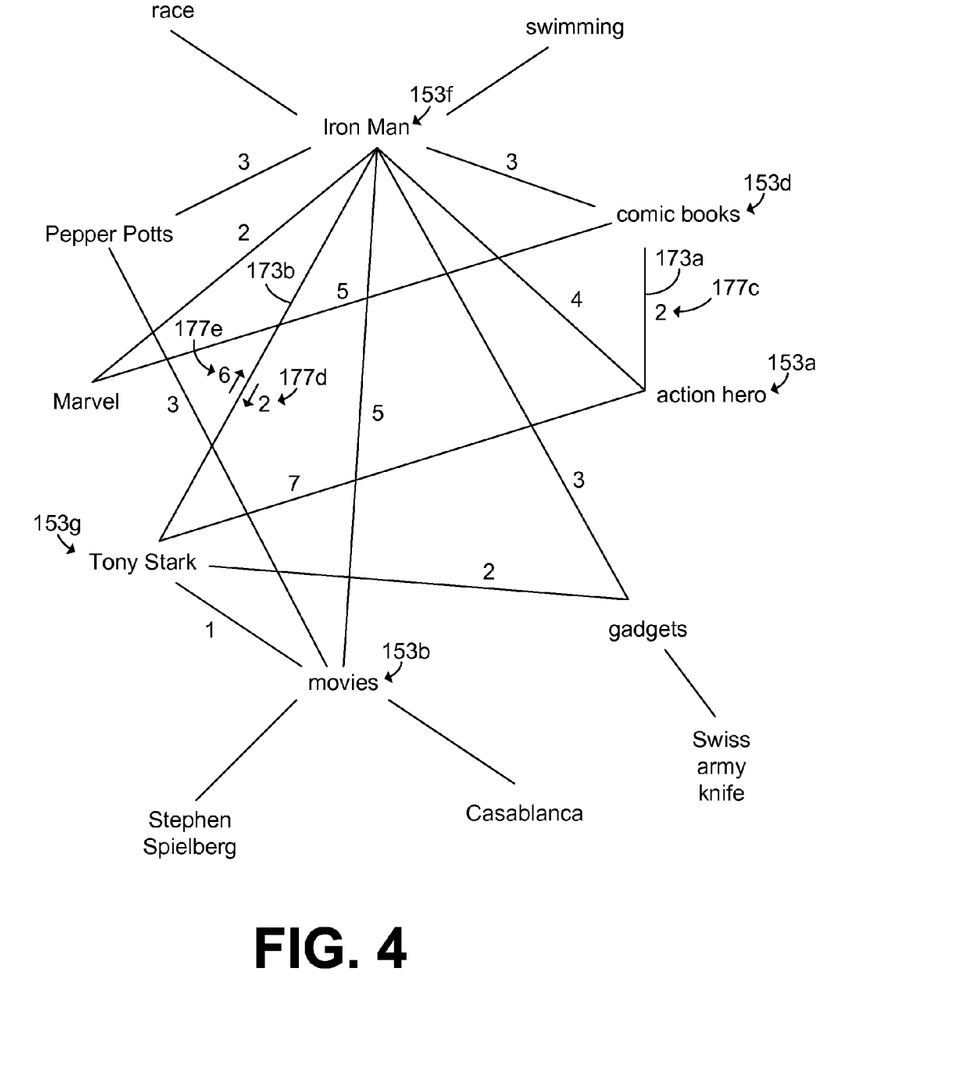
FIG. 4 is a diagram of an example of a plurality of relationships between keywords of FIG. 1 according to an embodiment of the present disclosure.

FIG. 4 illustrates nonlimiting examples of various keyword-keyword associations 173 (FIG. 1) according to an embodiment of the present disclosure. For example, in FIG. 4, keyword 153a (e.g., "action hero") is associated with keyword 153d (e.g., "comic books") in keyword-keyword association 173a, which has a corresponding score 177c (e.g., 2). Additionally, a keyword 153 may be associated with more than one keyword 153. For example, in FIG. 3, keyword 153a (e.g., "action hero") is associated with keywords 153d, 153f, and 153g (e.g., "comic books," "Iron Man," and "Tony Stark").

As another nonlimiting example, keyword 153g (e.g., "Tony Stark") is associated with keyword 153f (e.g., "Iron Man") in a keyword-keyword association 173, denoted herein as 173b, which has associated scores 177, denoted herein as 177d, 177e (e.g., 6, 2, respectively). The value of the scores 177d, 177e depends on a direction associated with the score 177. In this example, the score 177d is associated with the direction from 153f (e.g., "Iron Man") to 153g (e.g., "Tony Stark"), and the score 177e is associated with the direction from 153g (e.g., "Tony Stark") to 153f (e.g., "Iron Man"). The score 177e (e.g., 6) is higher than the score 177d (e.g., 2) because "Tony Stark" is more strongly associated with "Iron Man" than "Iron Man" is associated with "Tony Stark." In other words, "Iron Man" may be associated with many other keywords 153 related to Iron Man athletic competitions, for example. In contrast, "Tony Stark" is probably associated with fewer keywords 153.

Figure 5:
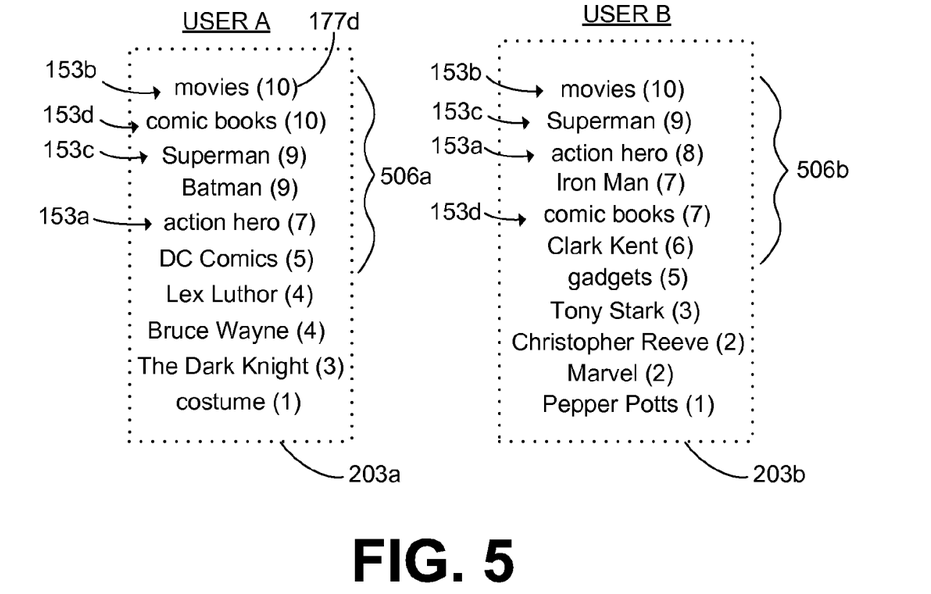
FIG. 5 is a diagram of the pools of FIG. 3 according to an embodiment of the present disclosure.

FIG. 5 illustrates the pools 203 of FIG. 3, and the keywords 153 (FIG. 1) in each pool 203 are ranked according to an embodiment of the present disclosure. The keywords 153 are ranked within each pool 203 based at least in part on the score 177 (FIG. 1) of the corresponding keyword-user association 169 (FIG. 1). A number of the highest-ranked keywords 153 are selected, and in FIG. 5 those keywords 153 are shown as being included in groups 506a, 506b.

Figure 6:
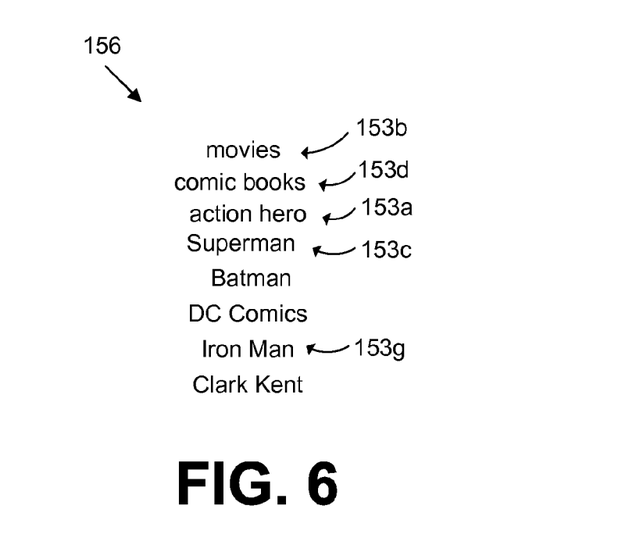
FIG. 6 is a diagram of an example of a cluster according to an embodiment of the present disclosure.

Turning now to FIG. 6, shown is an example of a cluster 156 (FIG. 1) of a number of keywords 153 (FIG. 1) that are clustered across the pools 203 illustrated in FIGS. 3 and 4. The cluster 156 includes keywords 153b, 153d, 153a, and 153c (e.g., "movies," "comic books," "action hero," and "Superman"), among others. The keywords 153b, 153d, 153a, and 153c, which are included in the cluster 156, are common to each pool 203f, 203g illustrated in FIG. 5, and each of the keywords 153 in the cluster 156 are also associated with scores 177 that are higher than other keywords 153 in the respective pools 203. The cluster 156 further includes other keywords 153 (e.g., "Batman," "DC Comics," "Iron Man," and "Clark Kent") that are highly ranked in each of the respective pools 203 but not common to each of the pools 203. In the example illustrated in FIG. 5, these other keywords 153 were included in one of groups 506a and 506b.

Figure 7:
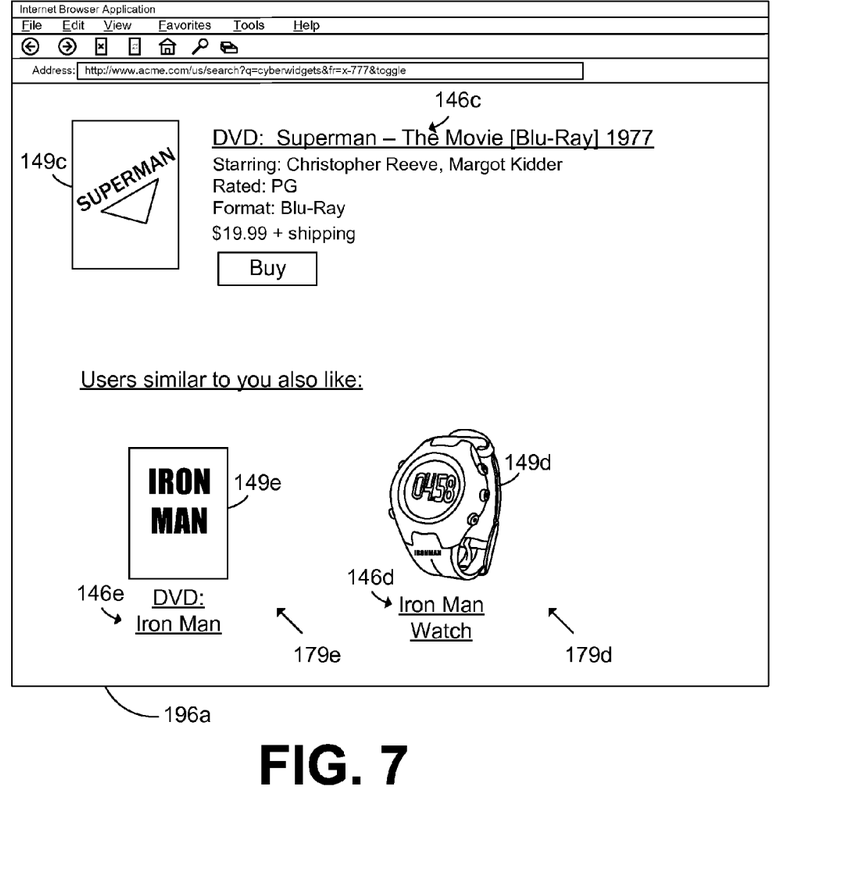
FIG. 7 is a drawing of an example of a network page rendered by a client in the networked environment of FIG. 1 according to various embodiments of the present disclosure.

Referring next to FIG. 7, shown is a network page 196 (FIG. 1), denoted herein as network page 196a, generated in association with the operation of the recommendation generator 186 (FIG. 1). It is understood that such a network page 196 is merely an example of the many different network pages 196 that may be generated to accomplish the various purposes discussed. To this end, the features included in the network page 196 are presented herein as examples, where other types of features may be employed in their place to accomplish the same underlying purposes. Further, the various features may be manipulated using various input devices such as keyboards, a mouse, microphones, and other devices as can be appreciated.

A network page 196 may be rendered on a display device 199 (FIG. 1) of a client 106 (FIG. 1). Information stored in a data store 136 (FIG. 1) on a computing device 103 (FIG. 1) may be presented to a user in the network page 196 communicated by the network interface application 139 (FIG. 1) over the network 109 (FIG. 1) to the client 106. Also, the network page 196a provides one example of the many different network pages 196 that may be created for different types of display devices 199 employed on a respective client 106. For example, a network page 196 may be formatted differently to fit on a small display screen of a personal digital assistant or other mobile device, etc. Additionally, different graphical user interface (GUI) components may be used.

FIG. 7 illustrates an example of a network page 196a rendered by a client 106 in the networked environment 100 of FIG. 1 according to various embodiments of the present disclosure. The network page 196a is generated in association with the operation of the recommendation generator 186 (FIG. 1). In this example, the network page 196a is an item detail page regarding item an item 146 (FIG. 1), denoted herein as 146c, and the network page 196a includes a plurality of recommendations 179 (FIG. 1), denoted herein as 179d and 179e, of items 146d and 146e (FIG. 3) (e.g., Iron Man Watch, DVD: Iron Man). The recommendations 179d and 179e may include item data 149 (FIG. 1) such as an item image. In the example illustrated in FIG. 7, the recommendations 179d, 179e each include an item image as item data 149d, 149e. In some embodiments, the recommendations 179 may further include links to other item detail pages (i.e., network pages 196) corresponding to the items 146 recommended.

Figure 8:
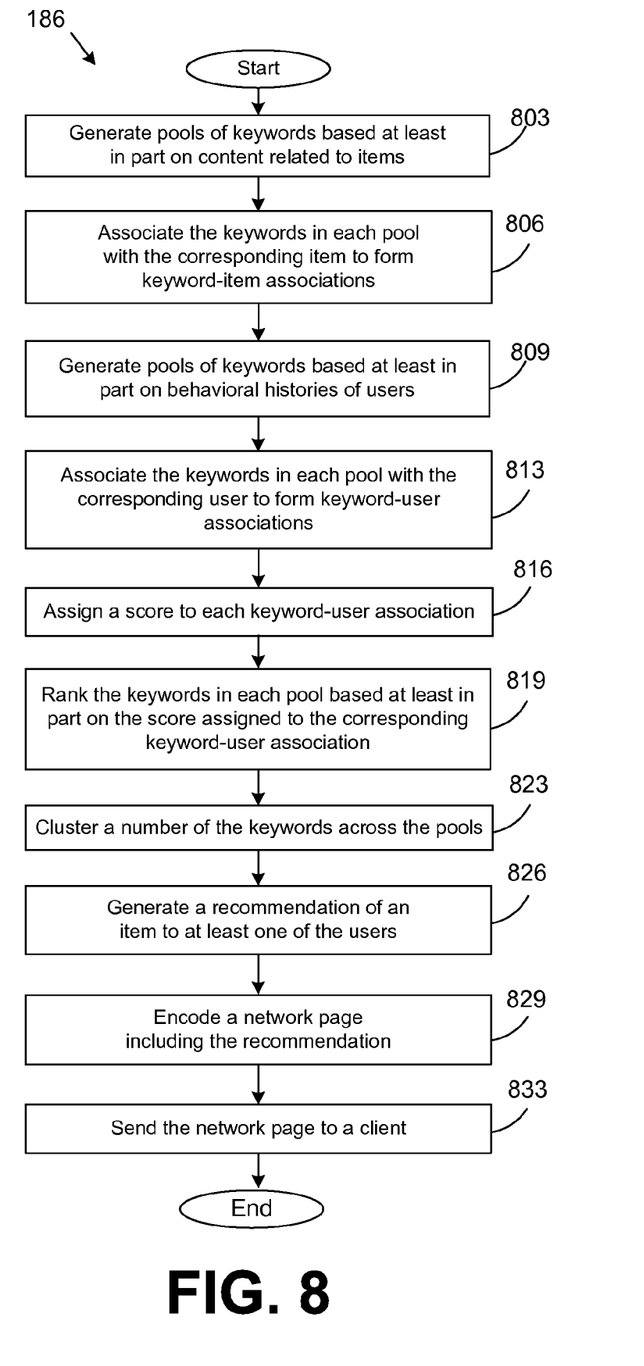
FIG. 8 is a flowchart illustrating one example of functionality implemented as portions of a recommendation generator executed in a computing device in the networked environment of FIG. 1 according to various embodiments of the present disclosure.

Referring next to FIG. 8, shown is a flowchart that provides one example of the operation of a portion of the recommendation generator 186 (FIG. 1) according to various embodiments. It is understood that the flowchart of FIG. 8 provides merely an example of the many different types of functional arrangements that may be employed to implement the operation of the portion of the recommendation generator 186 as described herein. As an alternative, the flowchart of FIG. 8 may be viewed as depicting an example of steps of a method implemented in the computing device 103 (FIG. 1) according to one or more embodiments.

Beginning with box 803, a plurality of pools 203 (FIG. 2) of keywords 153 (FIG. 1) are generated by a computing device 103 based at least in part on content related to items 146 (FIG. 1), such as item data 149 (FIG. 1) or other content related to items 146. In other words, the keywords 153 are extracted from content related to the items 146. As shown for example in FIG. 2, each pool 203 generated in box 803 corresponds to an item 146. Also, as illustrated in the example, the keywords 153 included in pool 203a (e.g., "Bruce Wayne," "The Dark Knight," "Batman," "action hero," and "movies") are extracted from item data 149 and other content related to the item 146a (e.g., DVD: Batman Begins).

Referring again to FIG. 8, in box 806, the keywords 153 in each pool 203 are associated with the item 146 that corresponds to the pool 203 to form keyword-item associations 166 (FIG. 1). For example, in FIG. 2, the keyword 153e (e.g., "Bruce Wayne") in pool 203a is associated with the item 146a (e.g., DVD: Batman Begins) to form the keyword-item association 166a.

In box 809, a computing device 103 generates pools 203 (FIG. 3) of keywords 153 (FIG. 1) based at least in part on a plurality of behavioral histories 163 (FIG. 1). Each pool 203 generated in box 809 corresponds to a behavioral history 163 associated with a user and a user account 159 (FIG. 1). For example, referring to the example illustrated in FIG. 3, pools 203f and 203g corresponding to users A and B, respectively, are generated based at least in part on the respective behavioral histories 163 associated with users A and B. In some embodiments, the pool 203 of keywords 153 are generated based at least on behavioral histories 163 that include behavioral content gathered from multiple domains. For example, keywords 153 may not only be extracted from content on a website provided for electronic commerce but also behavioral content included on a social networking forum related to a user and contacts associated with the user.

Referring again to FIG. 8, in box 813, the computing device 103 associates each keyword 153 in a pool 203 with the respective user to form a plurality of keyword-user associations 169 (FIG. 1). In other words, each keyword 153 in a pool 203 is associated with the user corresponding to the behavioral history 163 used to generate the pool 203. For example, FIG. 3 illustrates a keyword-user association 169a that associates the user A with the keyword 153e (e.g., "Bruce Wayne"), which is included in pool 203f.

Referring again to FIG. 8, in box 816, the computing device 103 assigns a score 177 (FIG. 1) to each keyword-user association 169 formed in box 813. For example, referring to FIG. 3, a score 177a (e.g., 4) is assigned to the keyword-user association 169a. The score 177 assigned is based at least in part on a behavioral history 163 corresponding to the user of the keyword-user association 169. For example, the score 177 may be based on at least one of the following factors in a behavioral history 163 that correspond to the keyword 153 associated with the user in the keyword-user association 169: a number of occurrences of the keyword 153 in the behavioral history 163, a phrase length, a purchase, a view, a return, a selection, and/or other data related to the keyword 153. Also, in some embodiments, the score 177 is based at least in part on at least one of a time decay and an inverse general population keyword popularity. In some embodiments, the score 177 may be based at least in part on a term frequency (TF), an in document frequency (IDF), a latent semantic analysis (LSA), and/or a latent semantic index (LSI) associated with the keyword 153 and the behavioral history 163 of the user.

In box 819, the computing device 103 ranks the keywords 153 within each pool 203. In some embodiments, the keywords 153 are only ranked in the pools 203 generated in box 809. The keywords 153 are ranked based at least in part on the score 177 assigned to the corresponding keyword-user association 169. For example, FIG. 5 illustrates the keywords 153 in each of the pools 203f and 203g as being ranked based at least in part on a score 177 associated with a respective keyword-user association 169. In the example, the keyword 153b (e.g., "movies") corresponding to the keyword-user association 169 having the highest score 177 is ranked the highest in the pool 203. What qualifies as a high ranking may vary. In the example illustrated in FIG. 5, groups 406, denoted herein as 506a, 506b, define the highly ranked keywords 153. A group 406 may include certain percentage of the keywords 153 associated with keyword-user associations 166 corresponding to the highest scores 177, or a group 406 may be a predetermined number of the keywords 153 associated with keyword-user associations 166 corresponding to the highest scores 177. The predetermined number may depend on the number of recommendations 179 that may be included in a network page 196.

Referring again to FIG. 8, in box 823, the computing device 103 clusters a number of the keywords 153 across two or more of the pools 203, forming a cluster 156 (FIG. 1). In some embodiments, the keywords 153 are only clustered across two or more pools 203 generated in box 809. In some embodiments, to cluster the number of keywords 153, the computing device 103 may identify at least one keyword 153 that is included in at least two of the pools 203 that is also highly ranked in each of the at least two pools 203. These identified keywords 153 form a cluster 156, and other keywords 153 in each of the at least two pools 203 are added to the cluster 156. The other keywords 153 may also be highly ranked in the respective pool 203 as well.

For example, referring to FIG. 6, shown is a cluster 156 including keywords 153 that are common to each pool 203 (e.g., "movies," "comic books," "action hero," and "Superman"). The cluster 156 further includes other keywords 153 (e.g., "Batman," "DC Comics," "Iron Man," and "Clark Kent") that are highly ranked in the respective pools 203 but not common to each of the pools 203. In the example illustrated in FIG. 5, these other keywords 153 were included in one of groups 506a and 506b.

Referring again to FIG. 8, in box 826, the computing device 103 generates a recommendation 179 (FIG. 1) of at least one item 146 to at least one of the users. In some embodiments, the computing device 103 generates the recommendation 179 based at least in part on a keyword-user association 169. Also, in some embodiments, the recommendation 179 is further based at least in part on at least one of the keyword-item associations 166 (FIG. 1), keyword-keyword associations 173 (FIG. 1), item-item associations 174 (FIG. 1), user-item associations 175 (FIG. 1), user-user associations 176 (FIG. 1), and/or a combination or correlation thereof. For example, the computing device 103 may generate the recommendation 179 based at least in part on a keyword-user association 169 and a keyword 153 associated with the item 146 in a keyword-item association 166. Further, the recommendation 179 is also based at least in part on a score 177 corresponding to each association.

In some embodiments, the recommendation 179 is based at least in part on the cluster 156 formed in box 823. For example, the computing device 103 may identify a keyword 153 in the cluster 156 that is associated with the user in a keyword-user association 166, and then the computing device 103 may identify another keyword 153 in the cluster 156 that is not yet associated with the user. This other keyword 153 may be used to identify an item 146 to recommend to the user in a recommendation 179. The recommendation 179 may be generated responsive to a search query, a selection of an item 146 other than one of the items 146 recommended in the recommendation 179, a selection of other content, and/or another input provided by the user.

Referring again to FIG. 8, in box 829, the computing device 103 encodes a network page 196 (FIG. 1) including the recommendation 179 of an item 146. The recommendation 179 may include item data 149 (FIG. 1) such as an item image. Also, in some embodiments, the recommendation 179 may further include links to item detail pages (i.e., network pages 196) corresponding to the item 146 recommended.

For example, FIG. 7 illustrates a network page 196a that is an item detail page regarding item 149c (e.g., DVD: Superman). The network page 196a further includes two recommendations 179, denoted herein as 179e and 179d, for items 146e and 146d (e.g., DVD: Iron Man and Iron Man Watch, respectively). These items 146 are recommended to user A of FIG. 3 using the keywords 153 included in the cluster 156 of FIG. 6. In other words, although none of the keywords 153 included in the pool 203f corresponding to user A include keyword 153g (e.g., "Iron Man"), the computing device 103 is able to determine that keyword 153g may be related to at least some of the keywords 153 that are highly ranked within pool 203f corresponding to user A.

Referring again to FIG. 8, in box 833, the computing device 103 sends the encoded network page 196 to a client 106 (FIG. 1) for rendering in a browser 194 via the network 109. For example, FIG. 7 illustrates an example of a network page 196a rendered in a browser 194 and displayed in a display device 199 of the client 106. The network page 196a, in this example, includes an item detail page regarding item 146c, and the network page 196a includes a plurality of recommendations 179, denoted herein as 179d and 179e, of items 146d and 146e (e.g., Iron Man Watch, DVD: Iron Man). The recommendations 179d and 179e also include item data 149 (FIG. 1), denoted herein as 149e, 149d, such as an item images.

Figure 9:
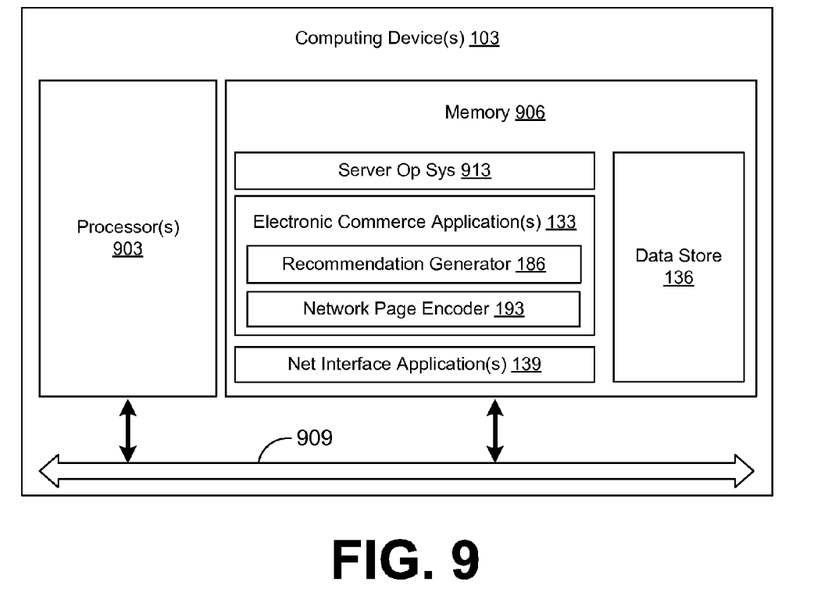
FIG. 9 is a schematic block diagram that provides one example illustration of a computing device employed in the networked environment of FIG. 1 according to various embodiments of the present disclosure.

With reference to FIG. 9, shown is a schematic block diagram of the computing device 103 according to an embodiment of the present disclosure. The computing device 103 includes at least one processor circuit, for example, having a processor 903 and a memory 906, both of which are coupled to a local interface 909. To this end, the computing device 103 may comprise, for example, at least one server computer or like device. The local interface 909 may comprise, for example, a data bus with an accompanying address/control bus or other bus structure, as can be appreciated.

Stored in the memory 906 are both data and several components that are executable by the processor 903. In particular, stored in the memory 906 and executable by the processor 903 are a recommendation generator 186, a network page encoder 193, and potentially other applications. Also stored in the memory 906 may be a data store 136 and other data. In addition, an operating system may be stored in the memory 906 and executable by the processor 903.

It is understood that there may be other applications that are stored in the memory 906 and are executable by the processors 903 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network 109 (FIG. 1) that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the recommendation generator 186, the network page encoder 193, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 8 shows the functionality and operation of an implementation of portions of the recommendation generator 186. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including a recommendation generator 186, a network page encoder 193, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the Therefore, the following is claimed:

1. A non-transitory computer-readable medium embodying a program executable in a computing device, the program comprising:
  code that gathers content based at least in part on view data associated with a user on a first domain;
  code that identifies a plurality of keywords based at least in part on the content;
  code that associates the keywords and the user to form keyword-user associations;
  code that assigns a score to each of the keywords corresponding to the keyword-user associations;
  code that ranks the keywords based at least in part on the corresponding score;
  code that selects a number of the keywords based at least in part on a ranking;
  code that retrieves a plurality of other keyword-user associations based at least in part on the selected keywords, the other keyword-user associations corresponding to other users and a second domain; and
  code that recommends an item available from the first domain based at least in part on the other keyword-user associations.

2. The computer-readable medium of claim 1, wherein each of the other keyword-user associations is associated with a score, the program further comprising code that ranks the other keyword-user associations based at least in part on the score.

3. The computer-readable medium of claim 1, wherein the recommendation is further based at least in part on keyword-keyword associations.

4. A system, comprising:
  at least one computing device; and
  a recommendation generator executable in the at least one computing device, the recommendation generator comprising:
    logic that generates a plurality of pools of keywords based at least in part on a plurality of behavioral histories, each pool corresponding to a behavioral history of a user across a plurality of domains;
    logic that clusters at least a number of the keywords in a cluster across at least two pools including the same keyword; and
    logic that recommends an item based at least in part on the cluster of keywords.

5. The system of claim 4, wherein the recommendation generator further comprises logic that ranks the keywords in each pool.

6. The system of claim 4, further comprising logic that assigns a score to each keyword in each pool based at least in part on the corresponding behavioral history.

7. The system of claim 4, wherein the recommendation generator further comprises logic that ranks the keywords in each pool based at least in part on the score.

8. The system of claim 4, wherein the recommendation is based at least in part on the cluster.

9. The system of claim 4, further comprising logic that identifies at least one keyword that is included in the at least two pools, wherein the at least one keyword is also highly ranked in each of the at least two pools.

10. The system of claim 4, further comprising logic that selects a number of highly ranked keywords from each of the at least two pools, the number of highly ranked keywords from each of the at least two pools being included in the cluster.

11. A method, comprising the steps of:
  identifying keywords based at least in part on a behavioral history corresponding to a user;
  associating the keywords with the user to form keyword-user associations; and
  recommending an item to the user based at least in part on the keyword-user associations.

12. The method of claim 11, wherein the behavioral history includes a first purchase history corresponding to a first domain and a second purchase history corresponding to a second domain.

13. The method of claim 11, wherein the behavioral history includes a view history gathered from a plurality of domains.

14. The method of claim 11, wherein the behavioral history includes content gathered from a social networking forum.

15. The method of claim 14, wherein the content gathered from the social networking forum includes content related to the user.

16. The method of claim 14, wherein the content gathered from the social networking forum includes content related to contacts associated with the user.

17. The method of claim 11, further comprising the step of assigning a score to each of the keyword-user associations.

18. The method of claim 11, further comprising the step of ranking the keyword-user associations based at least in part on the respective scores, the recommendation being further based at least in part on the ranked keyword-user associations.

19. The method of claim 11, wherein the score of the keyword-user associations are based at least in part on at least one of the following factors corresponding to the respective keyword: a number of occurrences in the behavioral history, a phrase length, a part of speech, a purchase, a view, a return, and a selection.

20. The method of claim 11, wherein the score is based at least in part on at least one of a time decay and an inverse general population keyword popularity.

21. The method of claim 11, wherein recommending the item is also based at least in part on a keyword-keyword association.

22. The method of claim 11, wherein recommending the item is also based at least in part on a keyword-item association.

23. The method of claim 11, further comprising:
  encoding the recommendation in a network page; and
  sending the network page to a client.

* * * * *